(12) United States Patent
Hattori

(10) Patent No.: US 12,103,552 B2
(45) Date of Patent: Oct. 1, 2024

(54) LIGHT EMISSION CONTROL DEVICE, LIGHT EMITTING DEVICE, VEHICLE, LIGHT EMISSION CONTROL METHOD, AND NON-TRANSITORY STORAGE MEDIUM

(71) Applicant: TOYOTA JIDOSHA KABUSHIKI KAISHA, Toyota (JP)

(72) Inventor: Tsutomu Hattori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 18/163,921

(22) Filed: Feb. 3, 2023

(65) Prior Publication Data
US 2023/0311753 A1    Oct. 5, 2023

(30) Foreign Application Priority Data
Mar. 31, 2022   (JP) ................. 2022-060658

(51) Int. Cl.
*B60W 50/14*    (2020.01)
*G02B 27/00*    (2006.01)
*G06V 20/58*    (2022.01)
*H05B 47/11*    (2020.01)
*H05B 47/115*   (2020.01)

(52) U.S. Cl.
CPC ......... *B60W 50/14* (2013.01); *G02B 27/0093* (2013.01); *G06V 20/58* (2022.01); *H05B 47/11* (2020.01); *H05B 47/115* (2020.01); *B60W 2540/225* (2020.02)

(58) Field of Classification Search
CPC ........... B60W 50/14; B60W 2540/225; G02B 27/0093; G06V 20/58; H05B 47/11; H05B 47/115
See application file for complete search history.

(56) References Cited

U.S. PATENT DOCUMENTS

| | | | |
|---|---|---|---|
| 10,315,556 B2 * | 6/2019 | Kawamata | ............. B60R 21/00 |
| 2016/0325676 A1 | 11/2016 | Yamada | |
| 2018/0086346 A1 | 3/2018 | Fujisawa et al. | |
| 2018/0118109 A1 | 5/2018 | Fujisawa et al. | |
| 2019/0033860 A1 * | 1/2019 | Okimoto | ............ B60H 1/00964 |
| 2020/0198527 A1 * | 6/2020 | Koehler | ................ H05B 45/10 |
| 2020/0384913 A1 * | 12/2020 | Nobuhara | ............. B60K 35/29 |
| 2022/0080888 A1 * | 3/2022 | Hayashi | ................ G06V 40/18 |
| 2022/0144086 A1 | 5/2022 | Sakurai et al. | |
| 2023/0225032 A1 * | 7/2023 | Jeong | ..................... B60J 1/2016 |
| | | | 701/49 |

FOREIGN PATENT DOCUMENTS

| | | | |
|---|---|---|---|
| DE | 102017202241 A1 | 8/2018 | |
| EP | 3 492 318 A1 | 6/2019 | |
| JP | H06332385 A | 12/1994 | |
| JP | 2011111123 A | 6/2011 | |

(Continued)

*Primary Examiner* — Mohamed Barakat
(74) *Attorney, Agent, or Firm* — Dickinson Wright, PLLC

(57) ABSTRACT

A light emission control device comprises a memory; and a processor coupled to the memory. the processor is configured to acquire information related to a target object in surroundings of a vehicle, and perform control so as to interlock light emission of a plurality of light emitting units provided inside the vehicle in a case in which the target object is present.

11 Claims, 17 Drawing Sheets

(56) References Cited

FOREIGN PATENT DOCUMENTS

| | | | |
|---|---|---|---|
| JP | 2015006830 | A | 1/2015 |
| JP | 2016197407 | A | 11/2016 |
| JP | 2019045901 | A | 3/2019 |
| JP | 2019137179 | A | 8/2019 |
| JP | 2020194499 | A | 12/2020 |
| JP | 2021066308 | A | 4/2021 |

\* cited by examiner

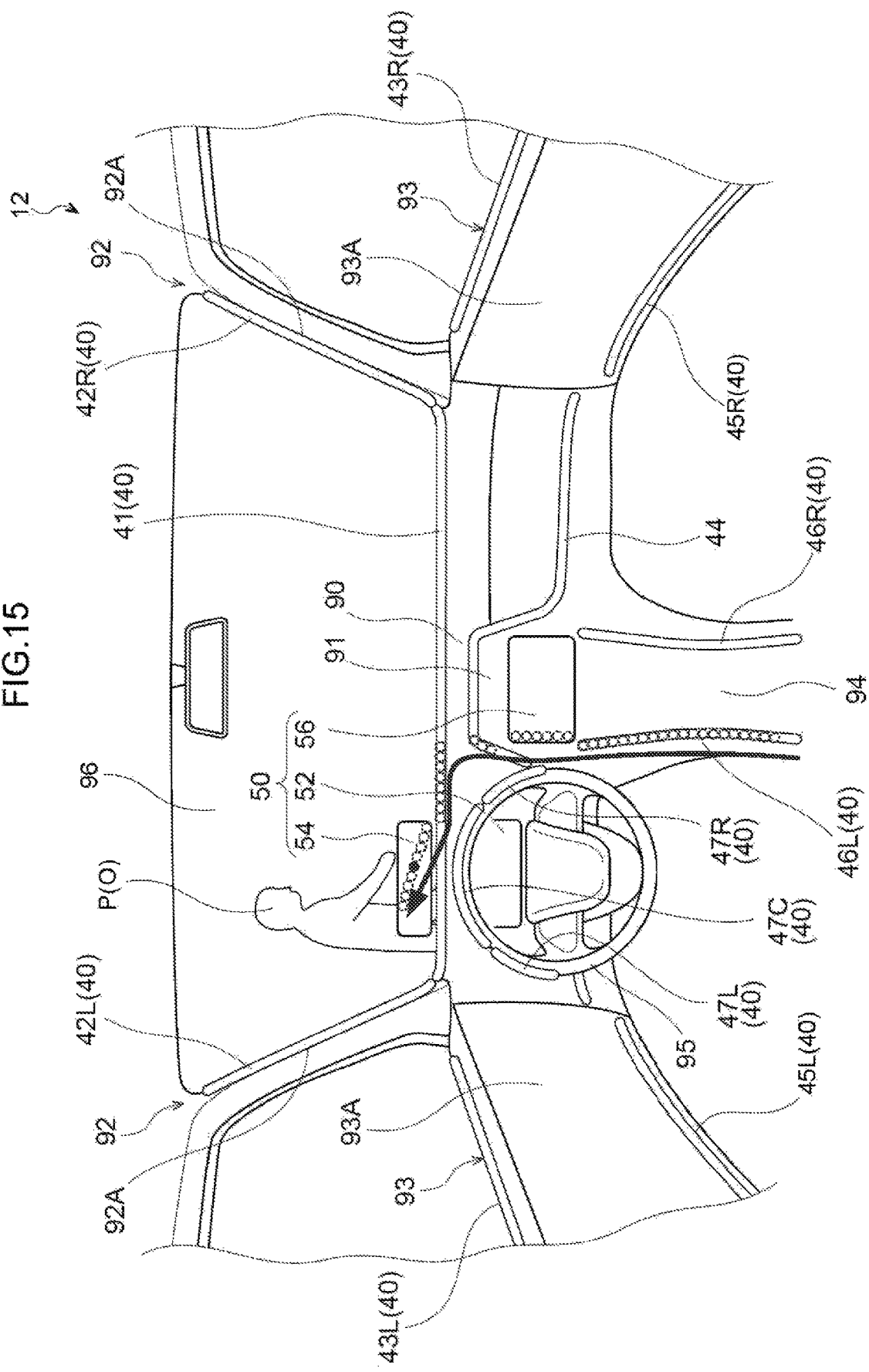

LIGHT EMISSION CONTROL DEVICE, LIGHT EMITTING DEVICE, VEHICLE, LIGHT EMISSION CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2022-060658 filed on Mar. 31, 2022, the disclosure of which is incorporated by reference herein.

BACKGROUND

Technical Field

The present disclosure relates to a light emission control device for performing control light emitting units provided in a vehicle, and to a light emitting device, vehicle, light emission control method, and non-transitory storage medium of the same.

Related Art

For example, in Japanese Patent Application Laid-Open (JP-A) No. 2015-006830 an information display device is disclosed that changes a light emission pattern of plural individual light sources provided in a row along a boundary edge between a front windshield glass and an instrument panel based on various information such as driving information and surrounding information for a vehicle.

There is room for improvement in raising an alerting effectiveness when notifying information to an occupant based on light emission of light emitting units.

SUMMARY

The present disclosure provides a light emission control device capable of raising an alerting effectiveness when notifying information to an occupant of a vehicle, and provides a light emitting device, a vehicle, a light emission control method, and a non-transitory storage medium of the same.

A light emission control device of a first aspect includes an object acquisition section for acquiring information related to a target object in surroundings of a vehicle, and a control section for performing control so as to interlock light emission of plural light emitting units provided inside the vehicle in a case in which the target object is present.

The light emission control device of the first aspect is configured such that the object acquisition section acquires the information related to a target object present in the surroundings of a vehicle, and the control section performs control so as to interlock light emission of the plural light emitting units.

The effectiveness in alerting an occupant is accordingly higher than a case in which plural light emitting units are simply caused to emit light. Namely, such a light emission control device enables the alerting effectiveness to be raised for a case in which information is notified to an occupant of a vehicle.

A light emission control device of a second aspect is the light emission control device of the first aspect wherein the control section performs control so as to move light emission of the plural light emitting units consecutively between the light emitting units.

In the light emission control device of the second aspect, the control section performs control so as to move light consecutively between the light emitting units when interlocking the light emission of plural light emitting units. The light emission control device is thereby able to guide the gaze of an occupant of a vehicle.

A light emission control device of a third aspect is the light emission control device of the first aspect or the second aspect wherein the object acquisition section further acquires a position of the target object with respect to an occupant of the vehicle, and the control section performs control so as to move light emission of the light emitting units consecutively either from the position of the target object or toward the position of the target object as viewed by the occupant.

The light emission control device of the third aspect is able to perform guidance to divert the gaze of the vehicle occupant from the target object by moving the light emission of the light emitting units from a position of the target object. Moreover, the light emission control device enables guidance to be performed so as to guide the gaze of the vehicle occupant toward the target object by moving the light emission of the light emitting units toward the position of the target object.

A light emission control device of a fourth aspect is the light emission control device of any one of the first aspect to the third aspect, wherein the light emission control device further includes a visual field acquisition section for acquiring information related to a central visual field of an occupant of the vehicle, and the control section performs control such that at least one of a start end or a finish end of consecutively moving light emission of the light emitting units is contained in a range of the central visual field.

In the light emission control device of the fourth aspect the visual field acquisition section acquires the information related to the central visual field of the vehicle occupant, and control is performed such that at least one of the start end or the finish end of light emission by the light emitting units is contained in the range of the central visual field. This light emission control device is accordingly able to further raise the alerting effectiveness due to a flow of light emission from the start end to the finish end always being contained in the central visual field of the occupant.

A light emission control device of a fifth aspect is the light emission control device of the fourth aspect wherein the control section defines a path for light emission from the plural light emitting units such that at least one of the start end or the finish end is contained in the range of the central visual field.

The light emission control device of the fifth aspect enables an increase in the number of variations for guiding the gaze of the occupant by performing control the path of flow of light emission from the start end toward the finish end.

The light emission control device of a sixth aspect is the light emission control device of the fourth aspect or the fifth aspect wherein the control section changes a mode of light emission of the light emitting units based on a relationship of the start end and finish end to the range of the central visual field.

In the light emission control device of the sixth aspect, the mode of light emission is changed based on the relationship of the light emission start end and finish end to the range of the central visual field. For example, light emission can be caused to flash at high frequency in a case in which the start end of the light emission is near an edge of the central visual field, thereby enabling awareness of the light emission to be imparted to the occupant. Moreover, in this light emission control device, for example, the light emission can be caused to diminish in light intensity as the finish end of the light emission nears a center of the central visual field, with this accordingly enabling the end of gaze guidance to be communicated.

A light emission control device of a seventh aspect is the light emission control device of any one of the first aspect to the sixth aspect, wherein the light emission control device further includes an environment acquisition section for acquiring environment information for at least one of inside or outside the vehicle, and the control section performs control light emission of the light emitting units based on the environment information.

In the light emission control device of the seventh aspect the light emission of the light emitting units is controlled based on the environment information at least at one of the inside or outside of the vehicle as acquired by the environment acquisition section. The environment information is information indicating a peripheral visual perception at the viewpoint of the vehicle occupant. Namely, this light emission control device performs control light emission according to the peripheral visual perception at the viewpoint of the occupant, thereby enabling the alerting effectiveness to be raised in an environment with poor peripheral visual perception.

A light emission control device of an eighth aspect is the light emission control device of the seventh aspect, wherein the control section performs control light emission of the light emitting units based on at least one of a contrast or a brightness inside the vehicle as the environment information.

The light emission control device of the eighth aspect performs control light emission according to the at least one of contrast or brightness at the viewpoint of the occupant and so, for example, is able to impart awareness effectively even in an environment with backlight and too high brightness.

A light emitting device of a ninth aspect includes the light emission control device of any one of the first aspect to the eighth aspect and plural of the light emitting units.

The light emitting device of the ninth aspect enables the alerting effectiveness to be raised.

A vehicle of a tenth aspect includes a sensing section for sensing the target object, and the light emitting device of the ninth aspect.

The vehicle of the tenth aspect is able to raise the alerting effectiveness.

A light emission control method of an eleventh aspect is executed by a processor, the light emission control method including acquiring information related to a target object in surroundings of a vehicle, and controlling so as to interlock light emission of plural light emitting units provided inside the vehicle in a case in which the target object is present.

In the light emission control method of the eleventh aspect the computer acquires the information related to a target object present in the surroundings of the vehicle and controls so as to interlock light emission of the plural light emitting units. The effectiveness in alerting the occupant is accordingly higher than a case in which the plural light emitting units are simply caused to emit light. Namely, this light emission control method enables the alerting effectiveness to be raised for a case in which information is notified to a vehicle occupant.

A program of a twelfth aspect is executable by a computer to perform light emission control processing, the light emission control processing including acquiring information related to a target object in surroundings of a vehicle, and controlling so as to interlock light emission of plural light emitting units provided inside the vehicle in a case in which the target object is present.

When the light emission control program of the twelfth aspect is executed, the computer acquires the information related to a target object present in the vehicle surroundings, and controls so as to interlock the light emission of the plural light emitting units. The effectiveness in alerting the occupant is accordingly higher than a case in which the plural light emitting units are simply caused to emit light. Namely, the light emission control program enables the alerting effectiveness to be raised for a case in which information is notified to a vehicle occupant.

The present disclosure enables the alerting effectiveness to be raised for a case in which a gaze of an occupant of a vehicle is guided.

BRIEF DESCRIPTION OF THE DRAWINGS

Exemplary embodiments of the present disclosure will be described in detail based on the following figures, wherein:

FIG. 15 illustrates an example of light emission notification in the third exemplary embodiment.

DETAILED DESCRIPTION

Explanation follows regarding an information notification system including a light emission control device of the present disclosure. The information notification system is a system in a vehicle for notifying a vehicle occupant, in particular a driver, that a target object has been sensed. That is to say, this information notification system interlocks plural light emitting units provided inside a vehicle and, for example, is a system to guide the gaze of an occupant to the target object by performing control each light emitting unit such that light flows in a set direction from a start end toward a finish end.

First Exemplary Embodiment

Overall Configuration

Figure 1:
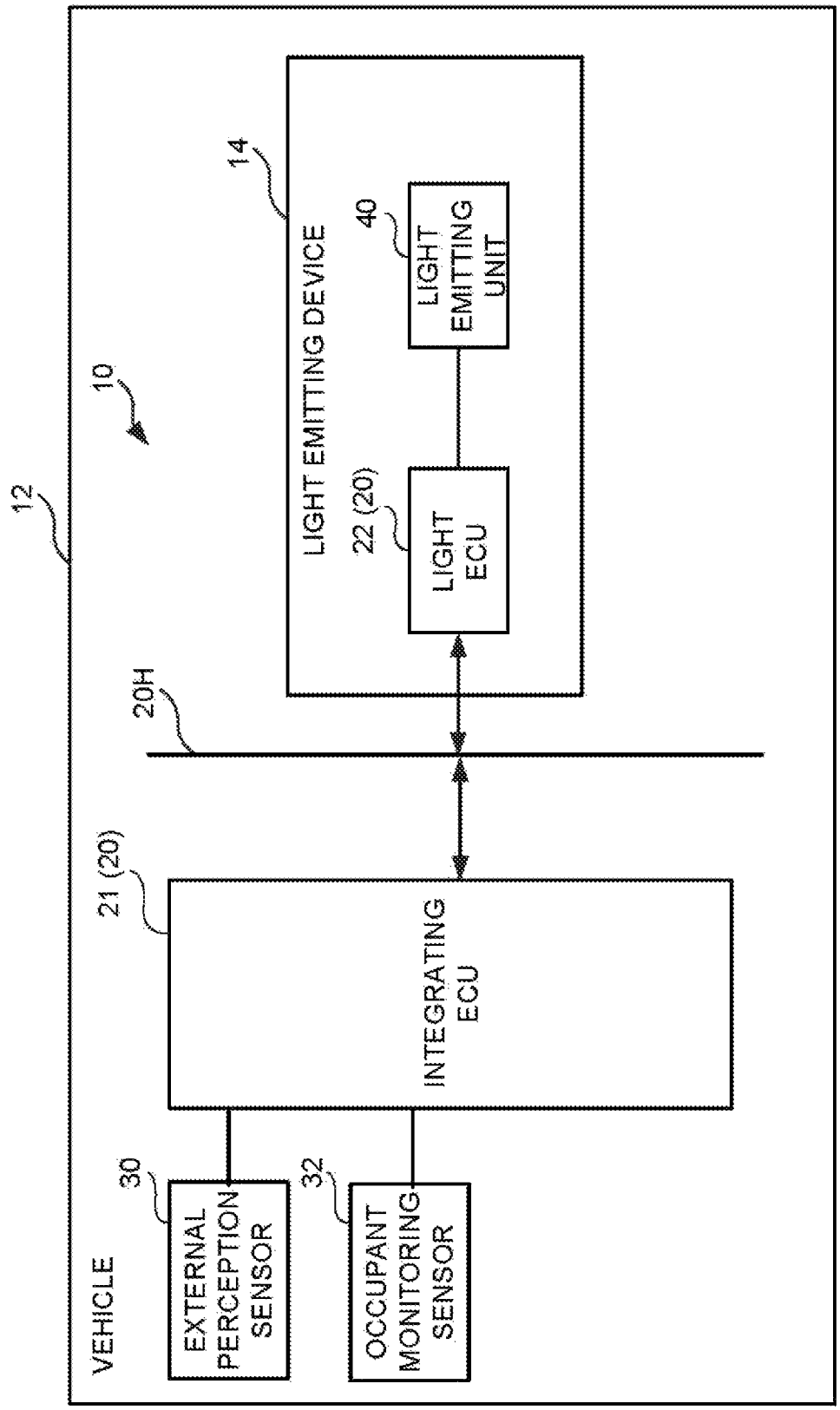
FIG. 1 is a block diagram illustrating a hardware configuration of a vehicle of a first exemplary embodiment.

As indicated in FIG. 1, an information notification system 10 of a first exemplary embodiment is provided to a vehicle 12. The information notification system 10 is configured including at least a light emitting device 14, an integrating electronic control unit (ECU) 21, an external perception sensor 30, and an occupant monitoring sensor 32. The light emitting device 14 includes a light ECU 22 and light emitting units 40.

Figure 2:
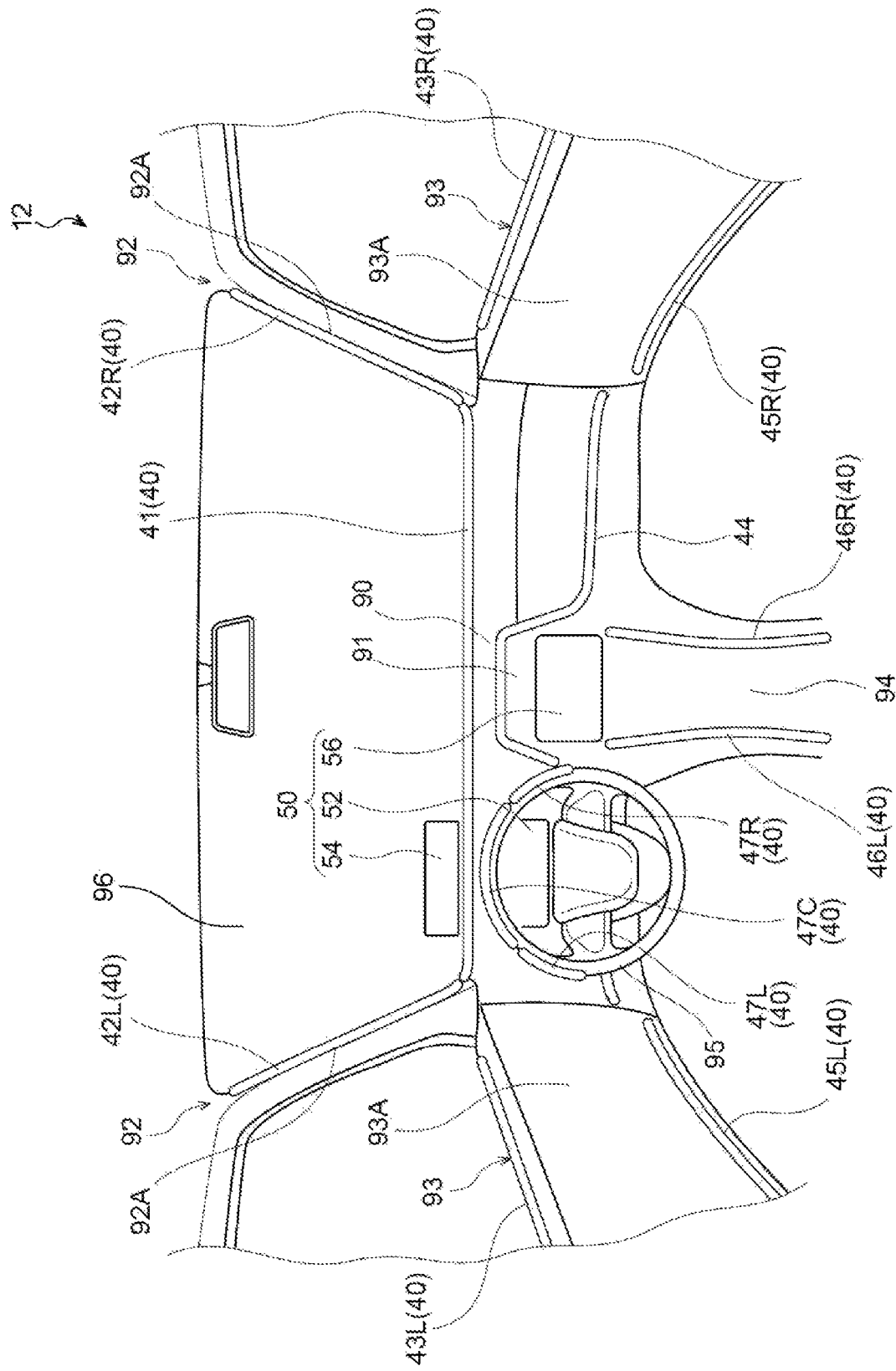
FIG. 2 is a diagram to explain an arrangement of light emitting units inside a vehicle of the first exemplary embodiment.

As illustrated in FIG. 2, the light emitting units 40 of the present exemplary embodiment are a group of plural lights provided inside the vehicle. Each of the light emitting units 40 is a linear light having a structure in which plural light emitting elements are arranged in a row. Examples of such light emitting elements include LEDs and organic electroluminescent (EL) elements.

The light emitting units 40 of the present exemplary embodiment include an upper center light 41, pillar lights 42L, 42R, upper door lights 43L, 43R, a lower center light 44, lower door lights 45L, 45R, console lights 46L, 46R, and steering lights 47L, 47C, 47R.

The upper center light 41 is arranged along an upper portion of a dashboard 90. The pillar light 42L is arranged along a garnish 92A of a front pillar 92 at a vehicle width direction left side (hereinafter simply referred to as "left side"), and the pillar light 42R is arranged along a garnish 92A of a front pillar 92 at a vehicle width direction right side (hereinafter simply referred to as "right side").

The upper door light 43L is disposed along an upper portion of a door trim 93A of a left side front door 93, and the upper door light 43R is disposed along an upper portion of a door trim 93A of a right side front door 93. The lower center light 44 is arranged along a lower left side portion of the dashboard 90, surrounding an upper portion of a center cluster 91, and running along a right side lower portion of the dashboard 90.

The lower door light 45L is arranged along a lower portion of the door trim 93A of the left side front door 93, and the lower door light 45R is arranged along a lower portion of the door trim 93A of the right side front door 93. The console light 46L is arranged along a left side of the center console 94, and the console light 46R is arranged along a right side of the center console 94.

The steering wheel light 47L is arranged along a steering wheel 95 at an upper left side of the steering wheel 95 when in a straight-ahead state. The steering light 47C is arranged along the steering wheel 95 at an upper central portion of the steering wheel 95 when in a straight-ahead state. Furthermore, the steering light 47R is arranged along the steering wheel 95 at an upper right side of the steering wheel 95 when in a straight-ahead state.

As illustrated in FIG. 1, the information notification system 10 according to the present exemplary embodiment includes plural ECUs 20. These ECUs 20 include at least the integrating ECU 21 and the light ECU 22 mentioned above.

Figure 3:
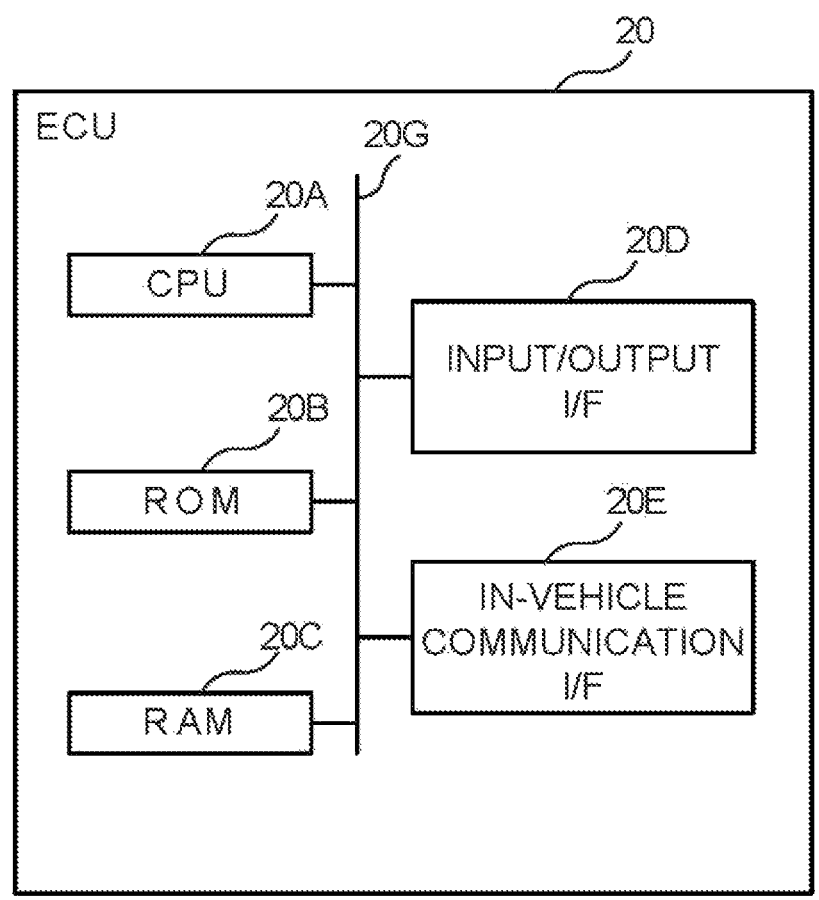
FIG. 3 is a block diagram illustrating a hardware configuration of an ECU of the first exemplary embodiment.

As illustrated in FIG. 3, the ECUs 20 are each configured including a central processing unit (CPU) 20A, read only memory (ROM) 20B, random access memory (RAM) 20C, an input/output I/F (interface) 20D, and an in-vehicle communication I/F 20E. The CPU 20A, the ROM 20B, the RAM 20C, the input/output I/F 20D, and the in-vehicle communication I/F 20E are connected together through an internal bus 20G so as to be able to communicate with each other.

The CPU 20A is a processor, and is a central processing unit for executing various programs and performs control each section. Namely, the CPU 20A reads a program from the ROM 20B serving as memory, and executes the program using the RAM 20C as workspace.

Various programs and various data are stored in the ROM 20B. Note that the ECUs 20 may also include storage serving as memory and configured by a hard disk drive (HDD) or a solid state drive (SSD), either instead of the ROM 20B or in addition to the ROM 20B. The RAM 20C serves as workspace to temporarily store programs or data.

The input/output I/F 20D is an interface for connecting to various types of sensor installed to the vehicle 12, such as, for example, the external perception sensor 30 and the occupant monitoring sensor 32.

The in-vehicle communication I/F 20E is an interface for connecting to each of the ECUs 20. This interface performs communication using a controller area network (CAN) protocol and Ethernet (registered trademark). The in-vehicle communication I/F 20E is connected to an external bus 20H (see FIG. 1).

As illustrated in FIG. 1, the external perception sensor 30 serves as a sensing section, and is configured from a group of sensors employed to detect objects and the like in the surroundings of the vehicle 12. The external perception sensor 30 includes units such as, for example, a camera for imaging the surroundings of the vehicle 12, a millimeter wave radar to emit probe waves and receive reflected waves, and a laser imaging detection and ranging (LIDAR) unit for scanning ahead of the vehicle 12.

The occupant monitoring sensor 32 is a device for monitoring an occupant state. The occupant monitoring sensor 32 includes at least a camera provided to a steering column (not illustrated in the drawings) for imaging the driver.

Integrating ECU

The integrating ECU 21 serves as a sensing section and includes a function to detect a travel path on which the vehicle 12 is traveling and objects in the surroundings of the vehicle 12 based on information acquired from the external perception sensor 30. Moreover, the integrating ECU 21 includes a function to estimate a central visual field of the driver based on images imaging the face of the driver acquired from the occupant monitoring sensor 32.

Figure 4A:
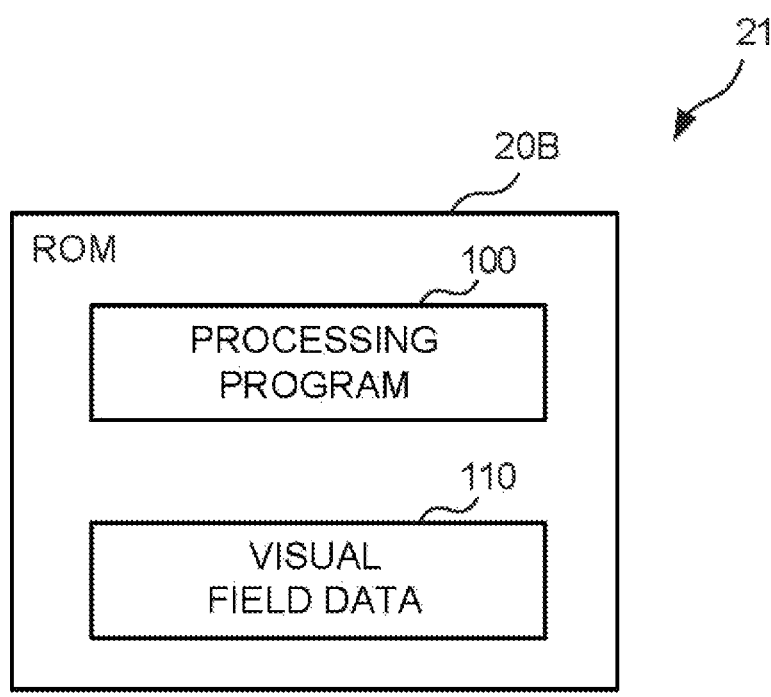
FIG. 4A is a block diagram illustrating a configuration of ROM of an integrating ECU of the first exemplary embodiment.

As illustrated in FIG. 4A, a processing program 100 and visual field data 110 are stored in the ROM 20B of the integrating ECU 21 of the present exemplary embodiment.

The processing program 100 is a program for performing control the integrating ECU 21.

The visual field data 110 is stored with a center value of information relating to the central visual field of a person. More specifically, a visual field range centered on a viewpoint is stored in the visual field data 110.

Figure 4B:
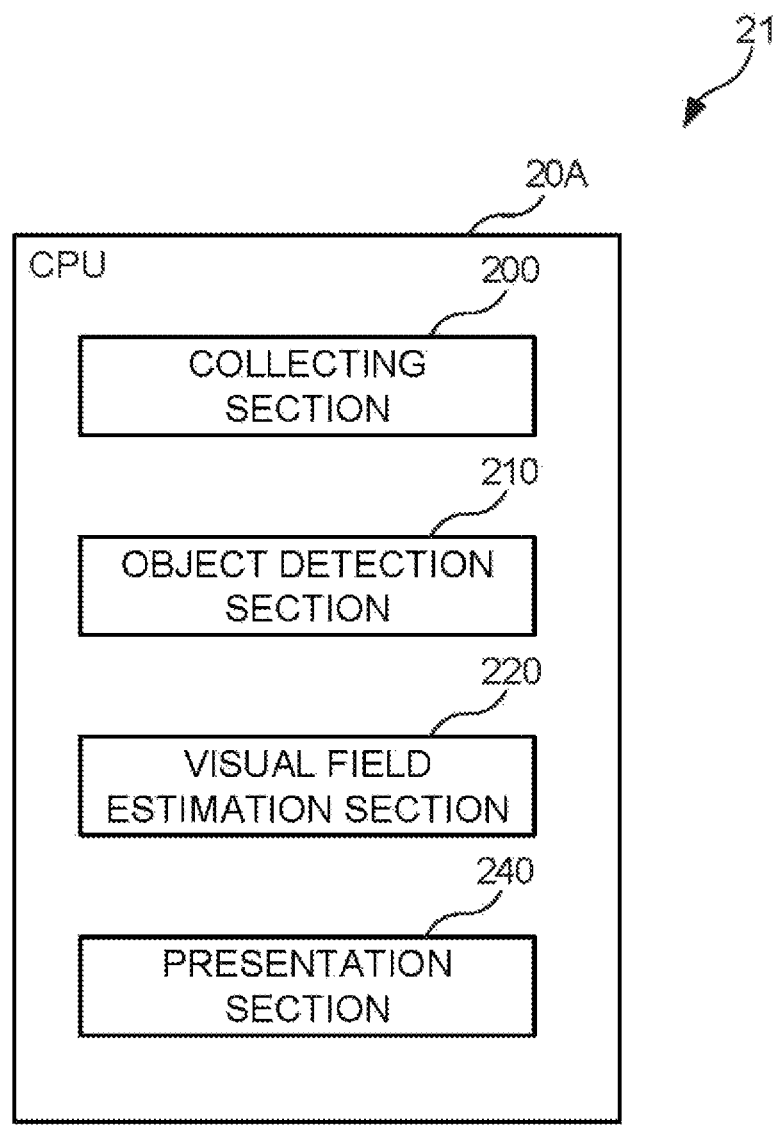
FIG. 4B is a block diagram illustrating a functional configuration of an integrating ECU of the first exemplary embodiment.

As illustrated in FIG. 4B, in the integrating ECU 21 of the present exemplary embodiment, by executing the processing program 100 the CPU 20A functions as a collecting section 200, an object detection section 210, a visual field estimation section 220, and a presentation section 240.

The collecting section 200 collects sensing information such as images imaging the travel path, and sensing information about pedestrians, vehicles, and the like as sensed by the external perception sensor 30. The collecting section 200 also collects images imaging the driver as imaged by the occupant monitoring sensor 32.

The object detection section 210 detects the presence of objects in the travel direction of the vehicle 12 based on the images imaging the travel path and the sensing information such as information about pedestrians, vehicles, signs, and the like as collected by the collecting section 200.

The visual field estimation section 220 estimates the central visual field of the driver based on the images imaging the driver as collected in the collecting section 200. More specifically, the visual field estimation section 220 identifies an inter-eye separation and a viewpoint of both eyes from the positions of the two eyes of the driver contained in the imaged images, and furthermore references the visual field data 110 to estimate the central visual field centered on the viewpoint of the driver.

The presentation section 240 includes a function to present the light ECU 22 with information about objects detected and information about the central visual field of the driver. The information about objects contains at least positional information for the objects with respect to the viewpoint of the driver, and may additionally contain information about object classification (for example, classifications of pedestrian, sign, etc.). The presentation section 240 transmits object information and driver central visual field information to the light ECU 22 either at specific time intervals or when an object has been detected.

Light ECU

Figure 5A:
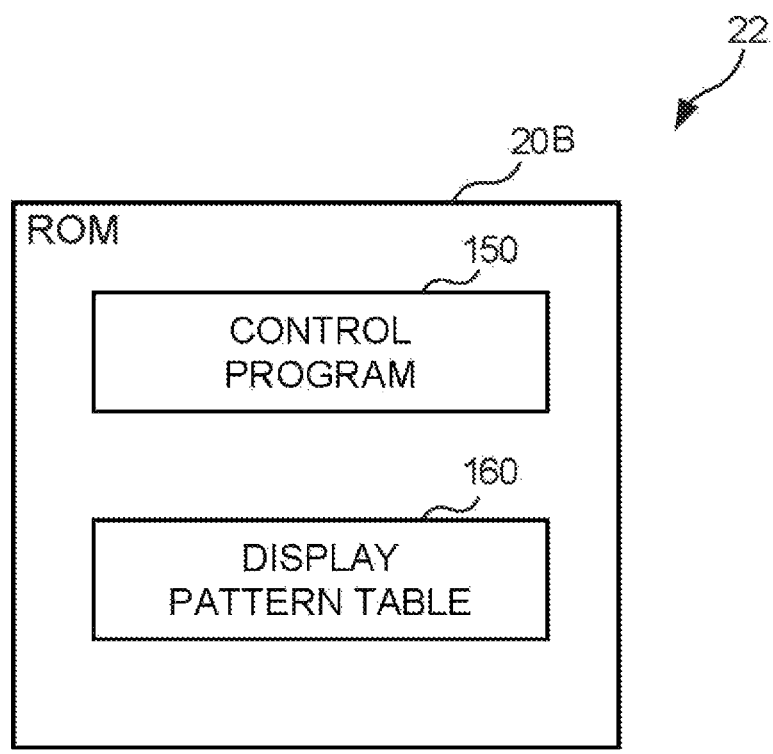
FIG. 5A is a block diagram illustrating a configuration of ROM of a light ECU of the first exemplary embodiment.

The light ECU 22 includes a function to perform control light emission from each of the light emitting units 40 configuring the light emitting device 14. As illustrated in FIG. 5A, a control program 150 serving as a light emission control program and a display pattern table 160 are stored in the ROM 20B of the light ECU 22 of the present exemplary embodiment.

The control program 150 is a program for performing control light emission of each of the light emitting units 40. The display pattern table 160 is a data table stored with paths and light emission modes for light emission by the light emitting units 40.

Figure 5B:
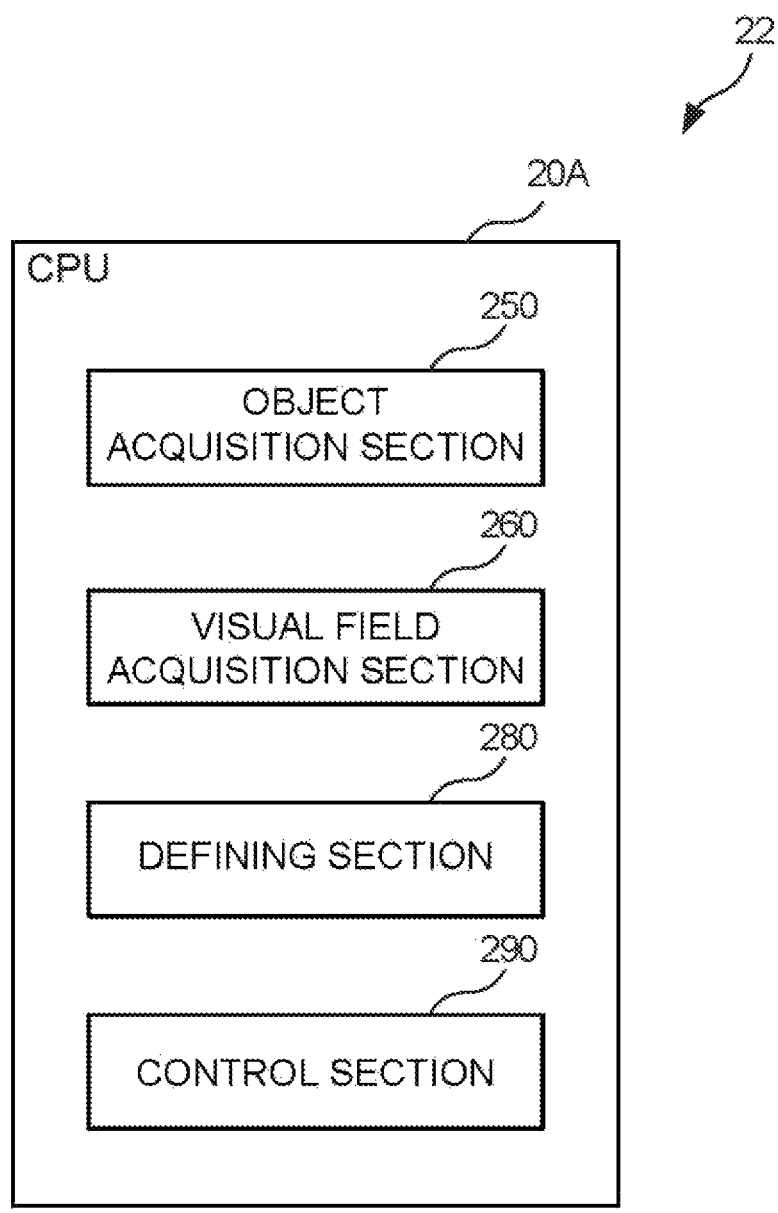
FIG. 5B is a block diagram illustrating a functional configuration of a light ECU of the first exemplary embodiment.

As illustrated in FIG. 5B, in the light ECU 22 of the present exemplary embodiment, by executing the control program 150 the CPU 20A functions as an object acquisition section 250, a visual field acquisition section 260, a defining section 280, and a control section 290.

The object acquisition section 250 includes a function to acquire object information transmitted from the integrating ECU 21.

The visual field acquisition section 260 includes a function to acquire information about the central visual field of the driver transmitted from the integrating ECU 21.

The defining section 280 defines a start end and a finish end in a case in which light emission is to be performed by interlocking plural of the light emitting units 40. The defining section 280 also includes a function to define a path along which to propagate light emission from the plural light emitting units 40. Furthermore, the defining section 280 includes a function to decide a light emission mode for the light emitting units 40. More specifically, the defining section 280 decides as a light emission mode a mode such as a mode of speed and color of light from the start end toward the finish end, a mode of flashing, repeating, etc.

The control section 290 includes a function to perform control light emission of the light emitting units 40. In a case in which the control section 290 of the present exemplary embodiment performs control so as to interlock light emission of the light emitting units 40, each of the light emitting elements of the light emitting units 40 is successively switched so as to cause light emission to proceed from the start end toward the finish end. In a case in which the path of light emission is configured by locations separated by a distance between adjacent light emitting units 40, a switching time for light emission can be adjusted according to the separation distance between the light emitting units 40, enabling the speed at which light flows to appear as a constant speed. Details regarding the control of the light emitting units 40 by the control section 290 are described later.

Control Flow

Figure 6:
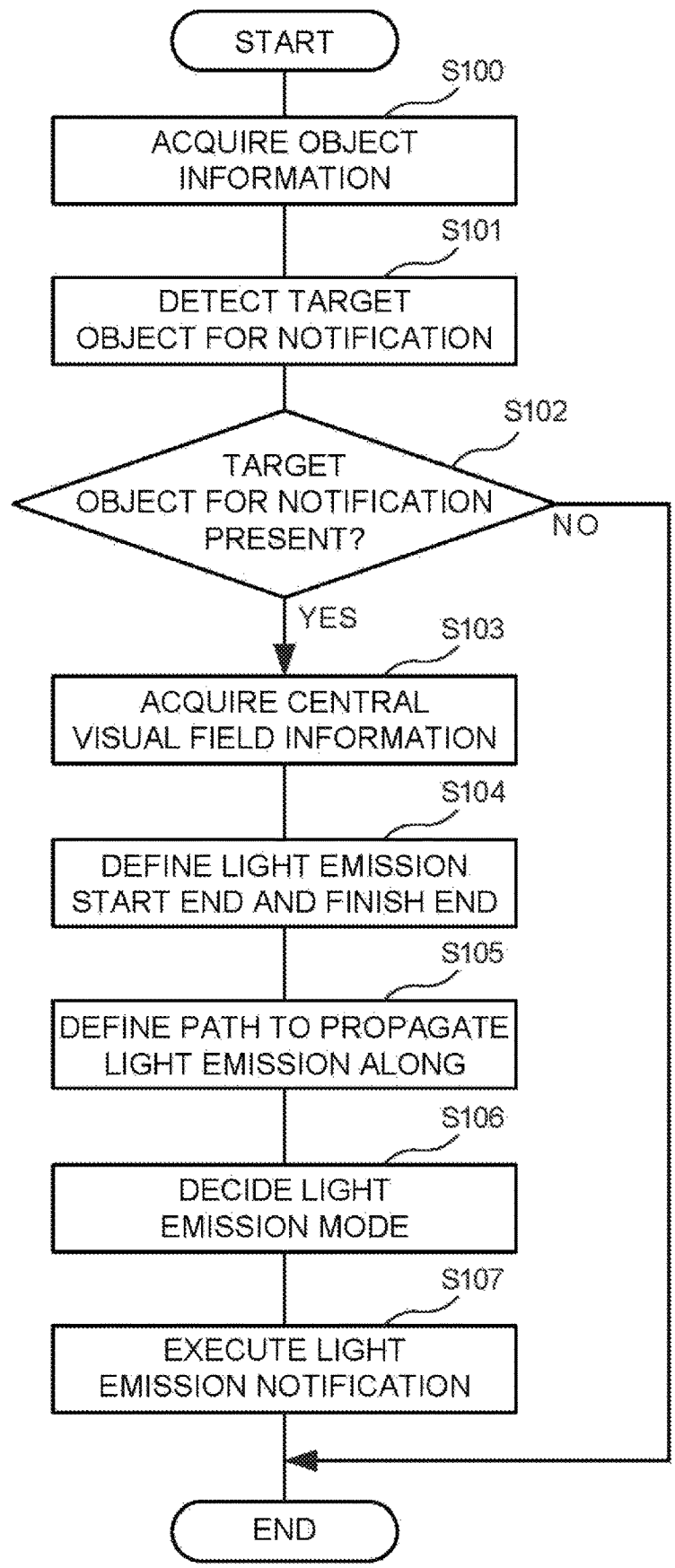
FIG. 6 is a flowchart illustrating a flow of gaze guidance processing executed in a light ECU of the first exemplary embodiment.

Explanation follows regarding a flow of gaze guidance processing executed by the light ECU 22 of the present exemplary embodiment, with reference to the flowchart of FIG. 6. The processing in the light ECU 22 is executed by the CPU 20A of the light ECU 22 so as to function as the object acquisition section 250, the visual field acquisition section 260, the defining section 280, and the control section 290.

At step S100 of FIG. 6, the CPU 20A acquires object information from the integrating ECU 21.

At step S101, the CPU 20A detects a target object O for notification to the driver. That is to say, the CPU 20A detects target objects O that should be notified to the driver based on position and classification of the object being sensed.

At step S102, the CPU 20A determines whether or not there is a target object O for notification to the driver. The CPU 20A proceeds to step S103 in a case in which determination is that there is a target object O for notification to the driver (step S102: YES). However, the CPU 20A ends the gaze guidance processing in a case in which determination is that there is no target object O for notification to the driver (step S102: NO).

At step S103, the CPU 20A acquires information about the central visual field of the driver from the integrating ECU 21.

At step S104 the CPU 20A defines a start end and a finish end for light emission by the light emitting units 40. More specifically, the CPU 20A defines a light emission start location of the light emitting units 40 a start end is contained in the central visual field of the driver.

At step S105 the CPU 20A defines a path along which to propagate light emission of the light emitting units 40. More specifically, the CPU 20A defines, as a path of light from the start end toward the finish end, a path that matches movement of the gaze of the driver, that is moreover a path able to have a guidance effect on the driver as the path along which to propagate light emission of the light emitting units 40.

At step S106, the CPU 20A decides a mode for light emission by the light emitting units 40. For example, the CPU 20A may decide a mode such that light emission flashes at a high frequency when the light emission start end is near to an edge of the central visual field.

At step S107, the CPU 20A executes the notification by light emission of the light emitting units 40. Namely, the CPU 20A performs control the light emitting units 40 according to the defined path and decided mode. The gaze guidance processing is then ended.

Light Emission Notification Example

Figure 7:
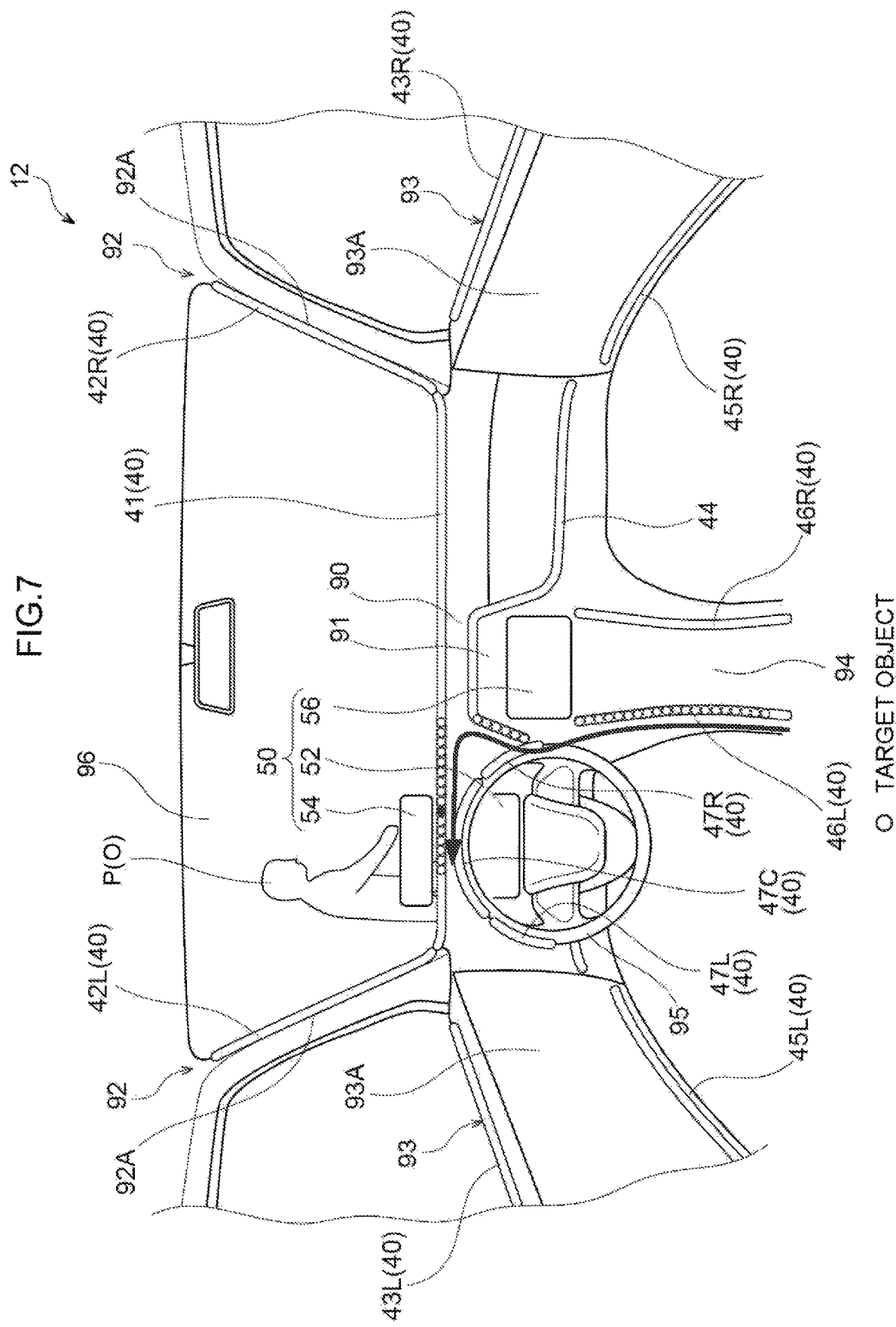
FIG. 7 illustrates an example of light emission notification of the first exemplary embodiment.
Figure 8:
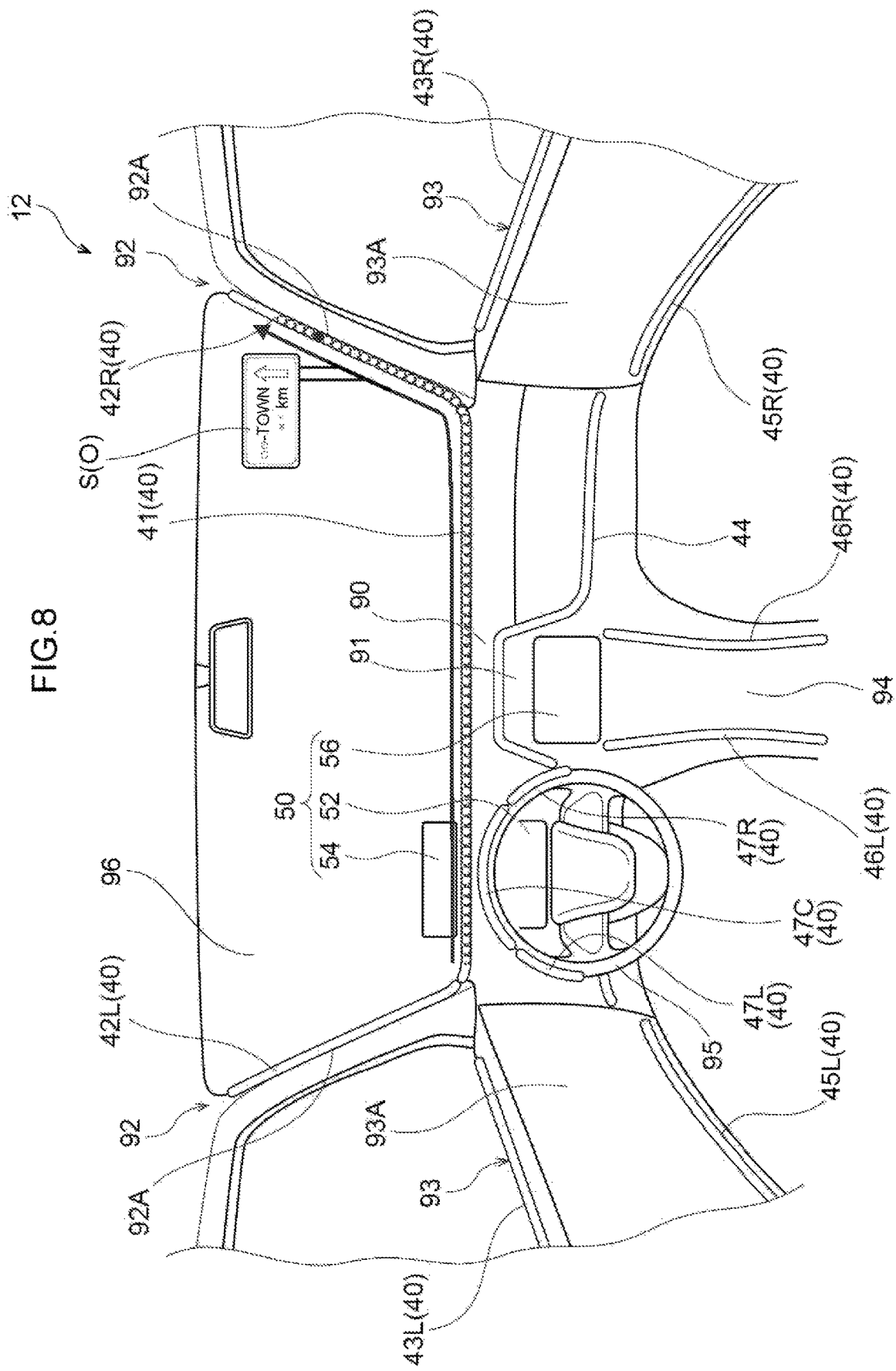
FIG. 8 illustrates an example of light emission notification of the first exemplary embodiment.

Explanation next follows regarding an example of light emission notification realized by the gaze guidance processing, with reference to FIG. 7 and FIG. 8.

FIG. 7 illustrates an example of light emission notification executed for a case in which the vehicle 12 has sensed a pedestrian P as a target object O that should be notified at a point in time when the driver's eyes are looking toward the center console 94. In such a case light emission is performed with a start end inside the central visual field of the driver looking at the center console 94, proceeds along a path so as to guide the gaze toward the left of the vehicle 12 as the driver is raising their face, and with a finish end at a position of the pedestrian P with respect to the viewpoint of the driver. More specifically, light flows toward the vehicle front from a start end on the console light 46L, via a left side of the center cluster 91 of the lower center light 44, from a central portion toward the left side of the upper center light 41, such that the position of the pedestrian P is at the finish end.

FIG. 8 illustrates an example of light emission notification executed for a case in which the vehicle 12 has sensed a sign S on the right side as a target object O that should be notified when the driver is looking toward the left side of the travel path. In such a case light emission is performed with a start end inside the central visual field of the driver looking toward the left side of the vehicle 12, proceeds along a path so as to make the driver look over toward the right side, and with a position of the sign S at the finish end from the viewpoint of the driver. More specifically, light flows toward the right side from a start end at the left end of the upper center light 41, from there moves directly over to the pillar light 42R, such that a position in the vicinity of the sign S on an upper portion of the pillar light 42R is at the finish end.

Exemplary Embodiment Summary

The light ECU 22 of the present exemplary embodiment is configured so as to acquire information related to target objects O in the surroundings of the vehicle 12, and to interlock the light emission of plural light emitting units 40. This means that an alerting effectiveness for a driver is higher than a case in which plural light emitting units 40 are simply caused to emit light. Namely, the present exemplary embodiment enables the alerting effectiveness to be raised.

In particular, in the present exemplary embodiment the light ECU 22 performs control so as to move light consecutively between the light emitting units 40 when interlocking the light emission from the plural light emitting units 40. The present exemplary embodiment is accordingly able to guide the gaze of the driver of the vehicle 12.

Moreover, the present exemplary embodiment enables guidance to be performed so as to guide the gaze of the driver of the vehicle 12 toward the target object O by moving the light emission from the plural light emitting units 40 toward the position of the target object O. Note that the light ECU 22 may be configured so as to perform control to move the light emission of the plural light emitting units 40 from the position of the target object O. In such case guidance can be performed to divert the gaze of the driver of the vehicle 12 from the target object O.

The light ECU 22 of the present exemplary embodiment acquires the information related to the central visual field of the driver of the vehicle 12 and performs control to include the start end of the light emission of the light emitting units 40 in the central visual field. This light emission control device accordingly makes a flow of light from the start end of the light emission be contained in the central visual field of the driver. The present exemplary embodiment is accordingly able to guide the gaze of the driver after alerting the driver to the light emission, enabling the alerting effectiveness to be further raised. In particular, the light ECU 22 of the present exemplary embodiment defines the path for light emission by the plural light emitting units 40 such that the start end of the light emission of the light emitting units 40 is contained in the range of the central visual field of the driver. The present exemplary embodiment is accordingly able to increase a number of variations for guiding the gaze of the driver.

Note that the light ECU 22 may perform control such that the finish end of the light emission is contained in the central visual field. This thereby enables guiding of the driver as to shift their gaze to face the finish end, which can assist facing their face toward the target object O. Control may also be performed such that the light emission start end and finish end are both contained in the central visual field. In such cases the advantageous effects can be obtained for both cases in which the start end is included in the central visual field and cases in which the finish end is included in the central visual field.

Furthermore, in the light ECU 22 of the present exemplary embodiment, the mode of light emission can be changed based on a relationship between the light emission start end and finish end to the range of the central visual field. For example, the light emission can be caused to flash at high frequency in a case in which the start end of the light emission is near to an edge of the central visual field, with this accordingly enabling awareness of the light emission to be imparted to the driver. Moreover, in the present exemplary embodiment, for example, the light emission can be caused to diminish in light intensity as the finish end of the light emission nears a center of the central visual field, with this accordingly enabling the light emission to be extinguished naturally when gaze guidance has finished.

Second Exemplary Embodiment

An information notification system 10 of a second exemplary embodiment is configured such that a path along which to propagate light emission from the light emitting units 40 and a light emission mode are corrected according to the inside and outside environments of the vehicle 12. Explanation follows regarding points of difference to the first exemplary embodiment.

Figure 9:
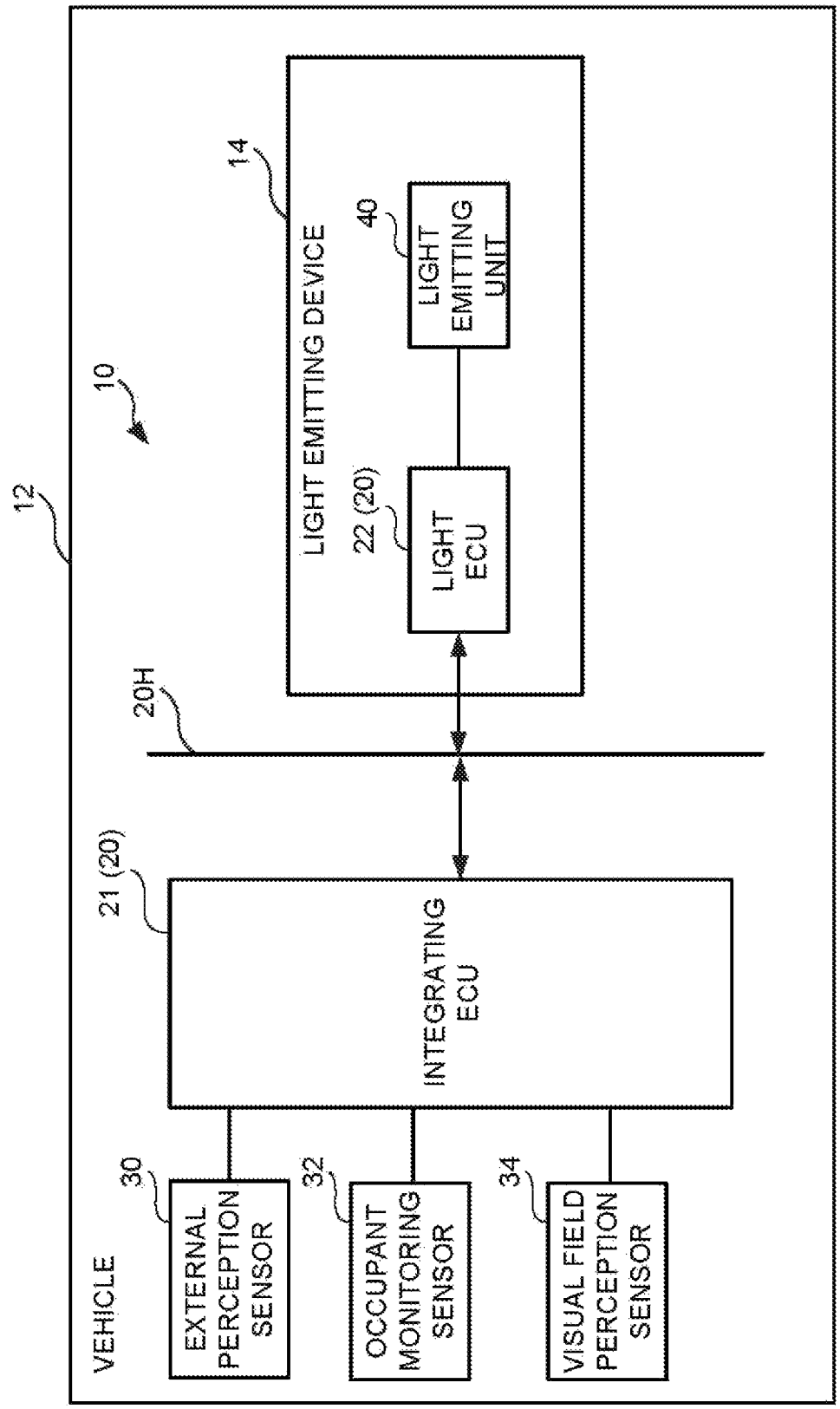
FIG. 9 is a block diagram illustrating a hardware configuration of a vehicle of a second exemplary embodiment.

As illustrated in FIG. 9, the information notification system 10 according to the present exemplary embodiment is configured including a visual field perception sensor 34 serving as a sensing section of a sensor type additional to the external perception sensor 30 and the occupant monitoring sensor 32.

The visual field perception sensor 34 includes an infrared camera for imaging both inside and outside the vehicle 12. The visual field perception sensor 34 senses, for example, images of the environment both inside and outside the vehicle 12, pedestrians, vehicles, and the like.

Figure 10:
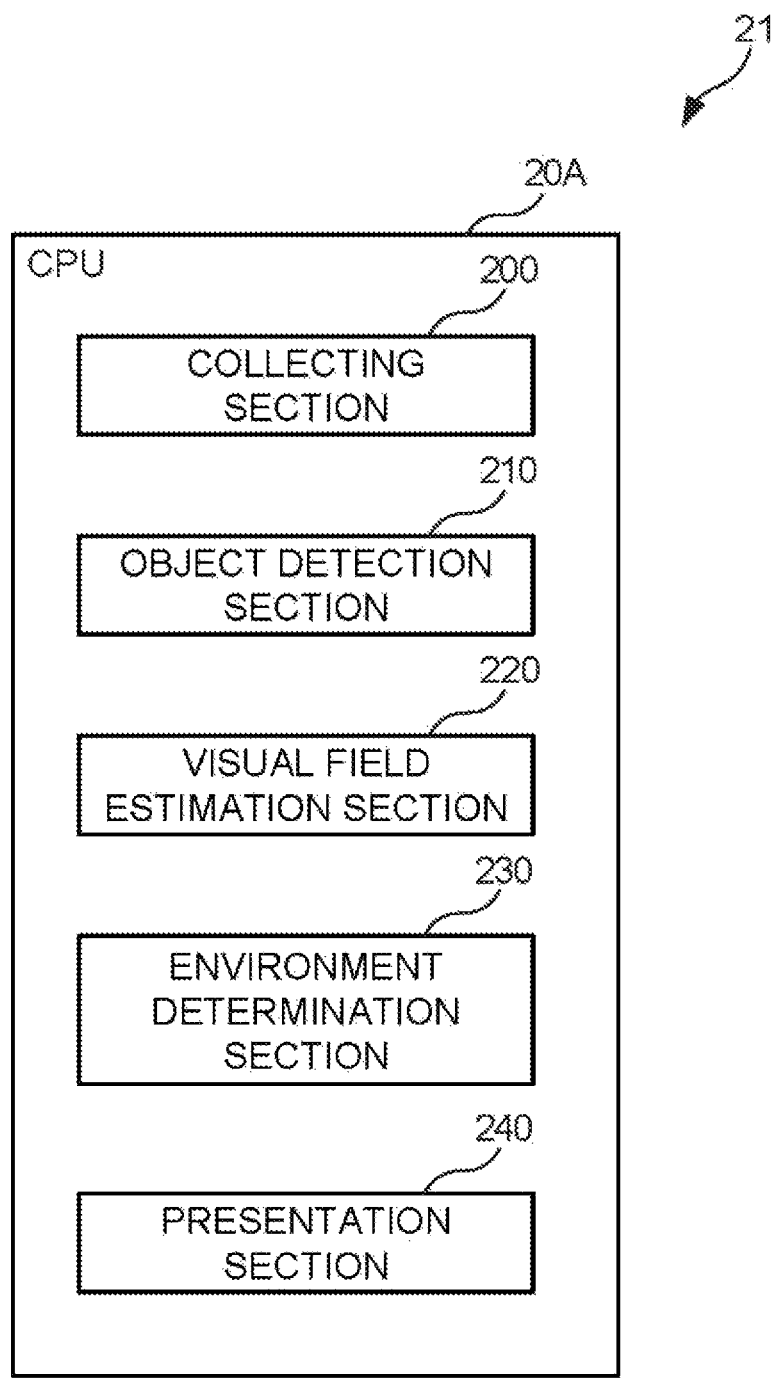
FIG. 10 is a block diagram illustrating a functional configuration of an integrating ECU of the second exemplary embodiment.

As illustrated in FIG. 10, in the integrating ECU 21 of the present exemplary embodiment, by executing the processing program 100 the CPU 20A functions as the collecting section 200, the object detection section 210, the visual field estimation section 220, an environment determination section 230, and the presentation section 240.

The environment determination section 230 includes a function to determine the environments both outside and inside the vehicle 12 based on images imaged by the external perception sensor 30, the occupant monitoring sensor 32, and the visual field perception sensor 34 as collected by the collecting section 200. More specifically, the environment determination section 230 determines an environment outside the vehicle that falls within the visual field of the driver based on the images of outside the vehicle 12 imaged by the external perception sensor 30 and on the images of outside the vehicle 12 imaged by the visual field perception sensor 34. Moreover, the environment determination section 230 determines the environment inside the vehicle that falls within the visual field of the driver based on the images imaged inside the vehicle 12 by the occupant monitoring sensor 32, and the images imaged inside the vehicle 12 by the visual field perception sensor 34. In the present exemplary embodiment "environment" means a peripheral visual perception at the viewpoint of the occupant (and in particular the driver) of the vehicle 12, and includes illuminance, color tone, contrast, and brightness. The presentation section 240 presents the light ECU 22 with, as environment information, the environment outside the vehicle that falls within the visual field of the driver, and the environment inside the vehicle that falls within the visual field of the driver, as determined by the environment determination section 230.

Figure 11:
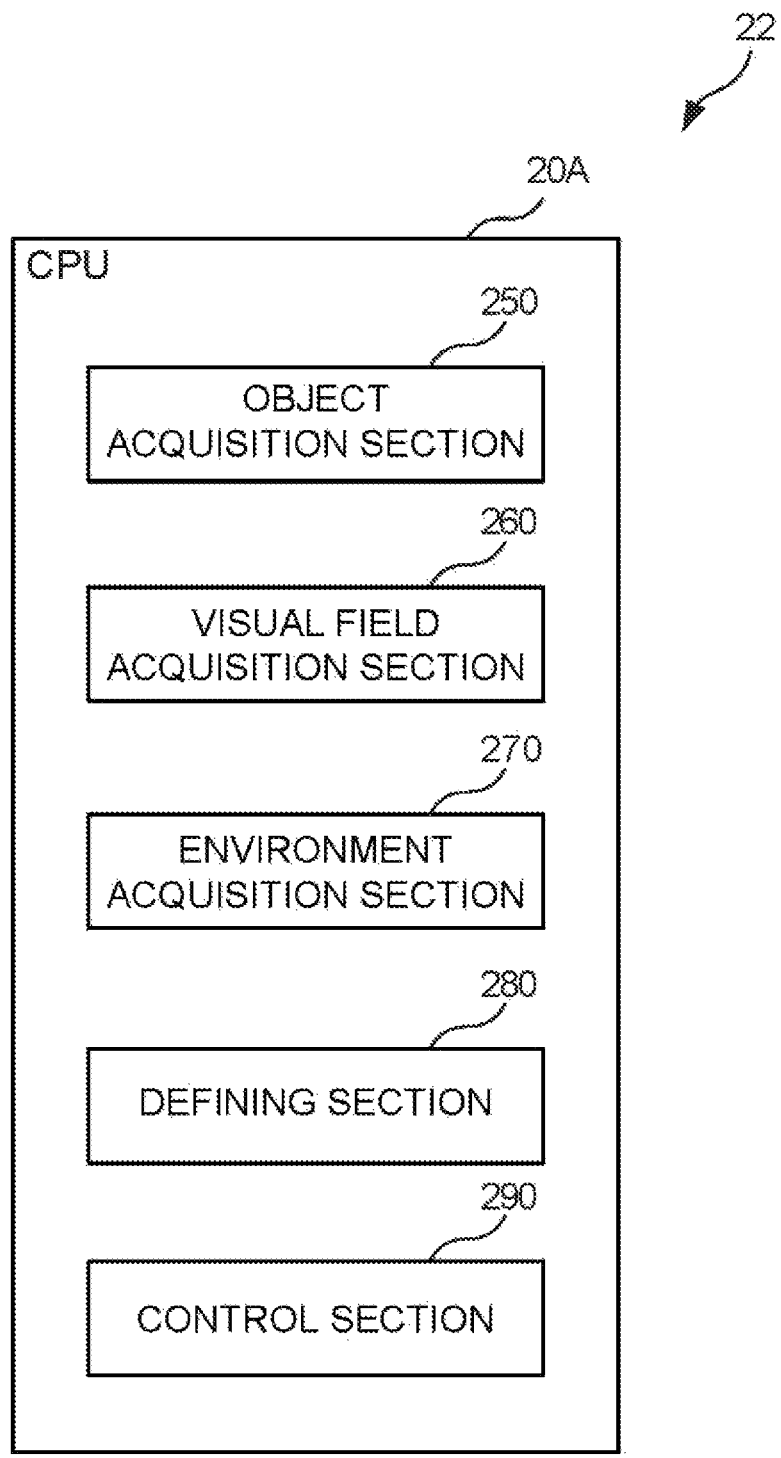
FIG. 11 is block diagram illustrating a functional configuration of a light ECU of a second exemplary embodiment.

As illustrated in FIG. 11, in the light ECU 22 of the present exemplary embodiment, by executing a control program 150 the CPU 20A functions as the object acquisition section 250, the visual field acquisition section 260, an environment acquisition section 270, the defining section 280, and the control section 290.

The environment acquisition section 270 includes a function to acquire environment information for both outside and inside the vehicle from the integrating ECU 21.

The defining section 280 of the present exemplary embodiment includes a function to define the start end and the finish end of the light emission of the light emitting units 40 and the path along which to propagate light emission, and to decide the light emission mode. Moreover, the defining section 280 also includes a function to correct the path along which to propagate the light emission based on the environment information for both outside and inside the vehicle acquired from the environment acquisition section 270.

Control Flow

Figure 12:
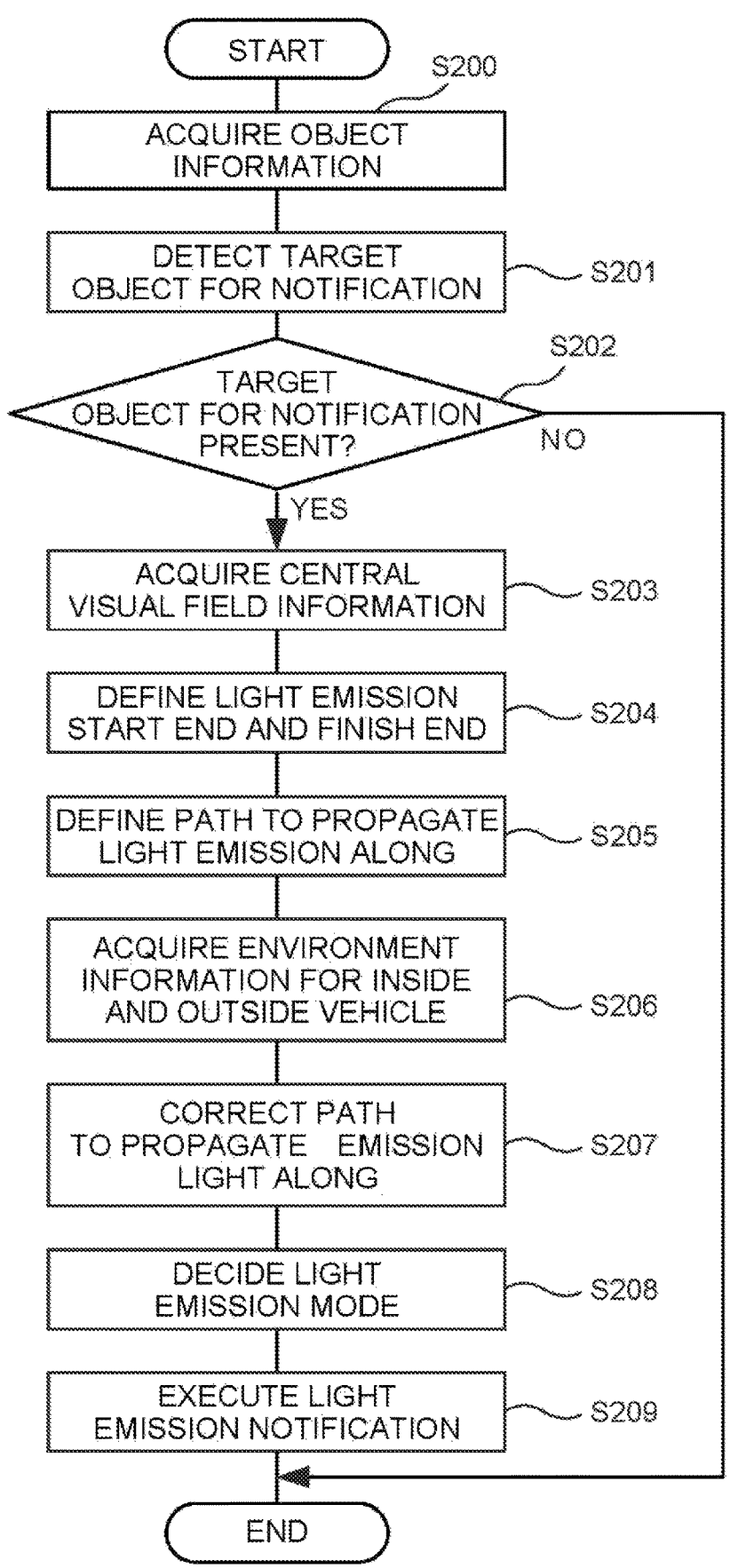
FIG. 12 is a flowchart illustrating a flow of gaze guidance processing executed in a light ECU of the second exemplary embodiment.

Next, description follows regarding a flow of gaze guidance processing executed by the light ECU 22 of the present exemplary embodiment, with reference to the flowchart of FIG. 12. The processing in the light ECU 22 is executed by the CPU 20A of the light ECU 22 so as to function as the object acquisition section 250, the visual field acquisition section 260, the environment acquisition section 270, the defining section 280, and the control section 290.

The processing of step S200 to step S205 of FIG. 12 is the same as the processing of step S100 to step S105 of the gaze guidance processing of the first exemplary embodiment.

At step S206 the CPU 20A acquires environment information for both outside and inside the vehicle from the integrating ECU 21.

At step S207, the CPU 20A corrects the path along which to propagate the light emission of the light emitting units 40 based on the environment information for outside and inside the vehicle.

The processing of step S208 and step S209 is the same as the processing of step S106 and step S107 of the gaze guidance processing of the first exemplary embodiment. The CPU 20A ends the gaze guidance processing by ending step S209.

Light Emission Notification Example

Figure 13:
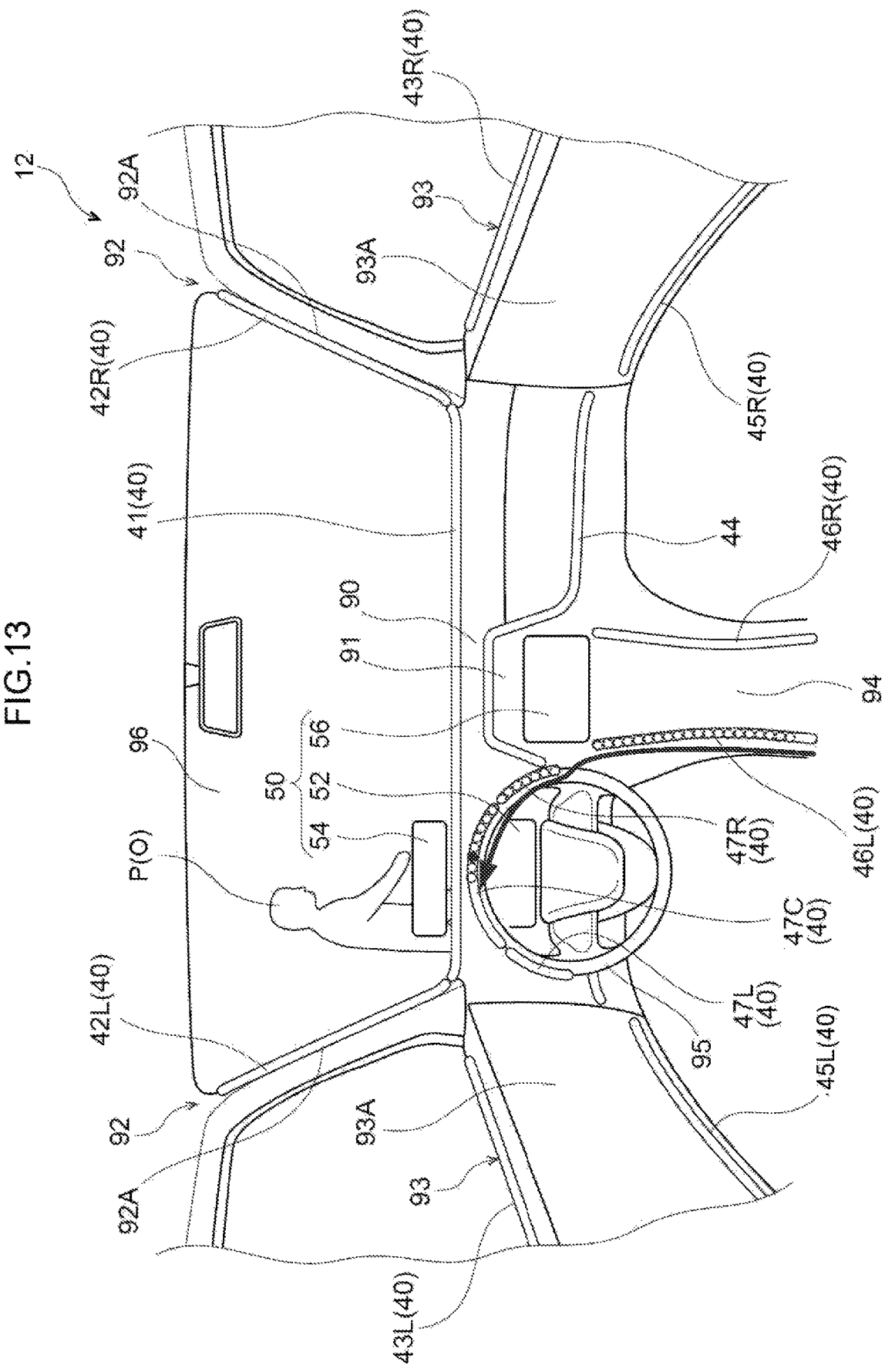
FIG. 13 illustrates an example of light emission notification in the second exemplary embodiment.

Explanation follows regarding an example of light emission notification realized by the gaze guidance processing of the present exemplary embodiment, with reference to FIG. 13. For example, consider an example of light emission notification executed for a case in which the vehicle 12 has sensed a pedestrian P as a target object O that should be notified when the driver's eyes are looking toward the center console 94, similar to the example of FIG. 7 in the first exemplary embodiment. In a case in which there is information indicating that the environment inside the vehicle contains a large amount of backlight from a front windshield 96, the path along which to propagate the light emission of the light emitting units 40 is corrected from being a path near to the front windshield 96 to a path away from the front windshield 96.

By performing this correction, as illustrated in FIG. 13, the light flows toward the vehicle front from a start end on the console light 46L, via the steering light 47R, such that a position of the pedestrian P is at a finish end on the steering light 47C.

Exemplary Embodiment Summary

The light ECU 22 of the present exemplary embodiment performs control the light emission of the light emitting units 40 based on the environment information regarding the inside and outside of the vehicle 12 acquired from the integrating ECU 21. The environment information is, as stated above, information indicating a peripheral visual perception at the viewpoint of an occupant of the vehicle 12. Namely, the present exemplary embodiment performs control the light emission according to the peripheral visual perception at the viewpoint of the occupant, and so is able to raise the alerting effectiveness in an environment of poor peripheral visual perception In particular, the present exemplary embodiment performs control the light emission according to at least one of contrast or brightness at the viewpoint of the driver, enabling awareness to be imparted effectively even in an environment with backlight and too high brightness.

Third Exemplary Embodiment

The information notification system 10 of the third exemplary embodiment is configured so as to utilize display on a display section 50, audio emitted from a speaker unit 60, and a sense of touch from a haptic device 70 when guiding the gaze, in addition to the light emission from the light emitting units 40. Explanation follows regarding points of difference to the second exemplary embodiment.

Figure 14:
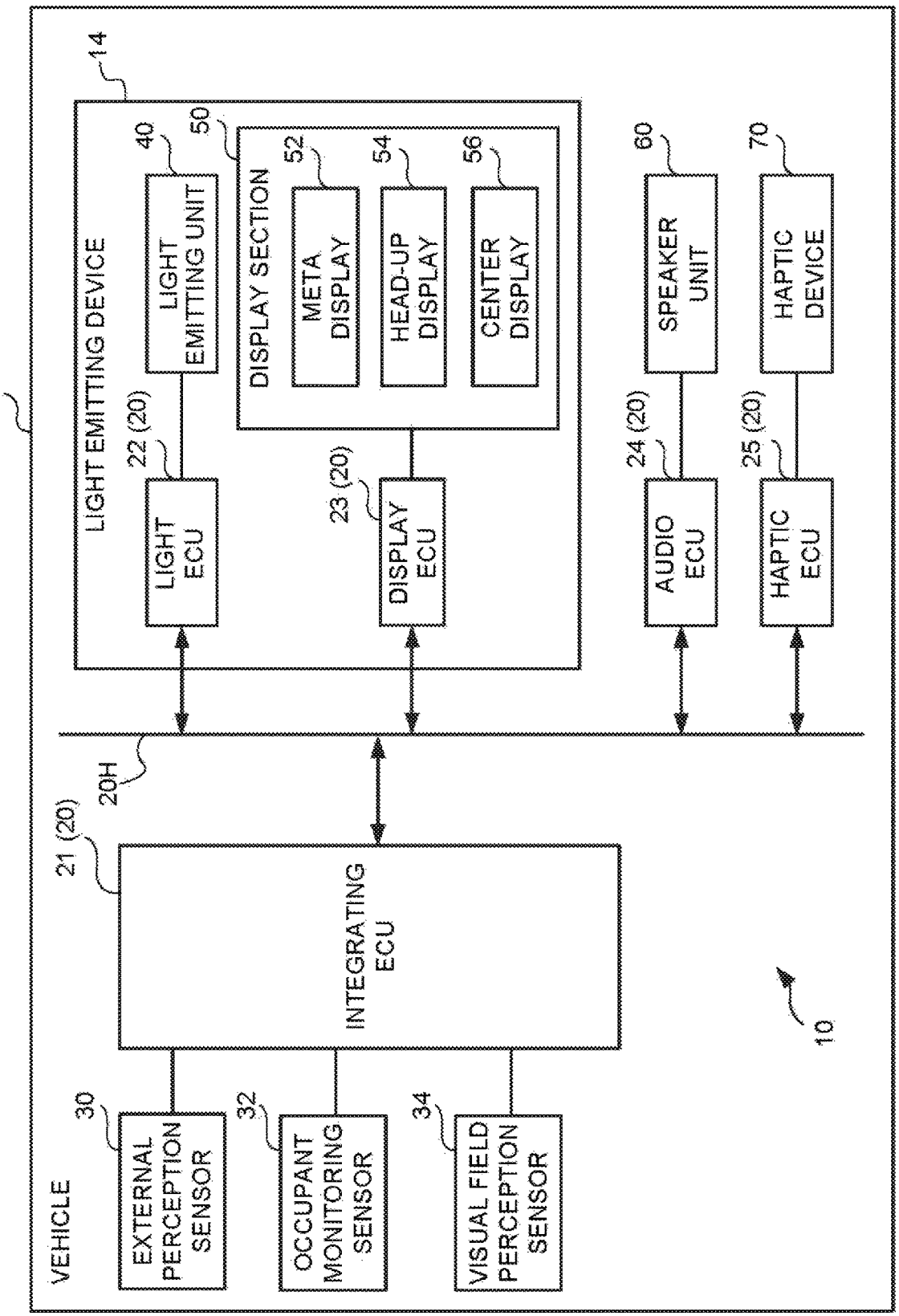
FIG. 14 is a block diagram illustrating a hardware configuration of a vehicle of a third exemplary embodiment.

As illustrated in FIG. 14, the information notification system 10 of the present exemplary embodiment, in addition to the configuration of the second exemplary embodiment includes as ECUs 20 a display ECU 23, an audio ECU 24, and a haptic ECU 25, and also includes the display section 50, the speaker unit 60, and the haptic device 70. The light emitting device 14 of the present exemplary embodiment is configured including the light ECU 22, the light emitting units 40, the display ECU 23 serving as a display control device, and the display section 50. Although omitted from illustration, the display ECU 23 includes a CPU serving as another processor, and ROM serving as another memory.

As illustrated in FIG. 2, the display section 50 includes a meta display 52 provided at on a front face of the steering wheel 95, a head-up display 54 provided on the front windshield 96, and a center display 56 provided to the center cluster 91.

The speaker unit 60 is provided at the left and right of the vehicle inside of the vehicle 12, such as at the garnishes 92A of the front pillars 92, at the door trims 93A of the front doors 93, or the like.

The haptic device 70 is a device to impart a vibration to touching fingers of the driver and is, for example, provide to the steering wheel 95.

Light Emission Notification Example

Next, description follows regarding an example of a light emission notification realized by the gaze guidance processing of the present exemplary embodiment.

FIG. 15 illustrates an example of light emission notification executed for a case in which the vehicle 12 has sensed a pedestrian P as a target object O that should be notified when the driver's eyes are looking toward the center console 94, similar to the example of FIG. 7 in the first exemplary embodiment. In the present exemplary embodiment, display (in other words light emission) of an image on the display section 50 is employed for light emission notification in addition to the light emitting units 40. More specifically, the display ECU 23 cooperates with the light ECU 22 such that light flows so as to move toward the vehicle front from a start end on the console light 46L, via the center display 56, from a central portion toward the left side of the upper center light 41, such that a position on the head-up display 54 that is superimposed on the pedestrian P is the finish end.

In a case in which light emission is performed with the light emitting units 40 alone, then the path along which to propagate the light emission is determined by the internal layout, and the arrangement of the light emitting units 40 disposed on the left and right of the layout. In contrast thereto, the present exemplary embodiment enables light emission to be performed by a path that looks natural by, in addition to the light emitting units 40, utilizing display of an image on the display section 50 to supplement the path along which to propagate the light emission of the light emitting units. Moreover, by exploiting the head-up display 54, the present exemplary embodiment enables light emission to be performed at a position closer to the target object O as viewed through the front windshield 96.

In a case in which notification of the target object O to the driver employs the speaker unit 60, this can be employed in combination with the light emission by the light emitting units 40. For example, the first exemplary embodiment is an example in which the light ECU 22 has sensed a sign S on the right side as the target object O that should be notified when the driver is looking toward the left side of the travel path. In such case, as illustrated in FIG. 8, gaze guidance can be supplemented by emitting audio in a sequence from the left side speaker 60 and then from the right side speaker 60 while also performing light emission so as to flow from the left side toward the right side.

Furthermore, in a case in which the haptic device 70 is employed for notification of the target object O that should be notified to the driver, then this can be employed together with light emission by the light emitting units 40. For example, in the example illustrated in FIG. 8, the light emission is performed so as to flow from the left side to the right side, and also the gaze guidance can be supplemented by adding vibration in sequence from the left side to the right side in the haptic device 70 of the steering wheel 95.

Remarks

In the information notification system 10 of each of the exemplary embodiments, the light ECU 22 is a light emission control device, however there is no limitation thereto, and the integrating ECU 21 may be the light emission control device. In such case, to realize similar functions to those of the second exemplary embodiment, the integrating ECU 21 would include the object acquisition section 250, the visual field acquisition section 260, the environment acquisition section 270, the defining section 280, and the control section 290 in addition to the collecting section 200, the object detection section 210, the visual field estimation section 220, the environment determination section 230, and the presentation section 240.

Moreover, although the information notification system 10 of each of the exemplary embodiments realizes light emission notification using the integrating ECU 21 and the light ECU 22, there is no limitation thereto, and the light emission notification may be realized using three or more ECUs 20. In such case, to realize similar functions to those of the second exemplary embodiment, the collecting section 200, the object detection section 210, the visual field estimation section 220, the environment determination section 230, the presentation section 240, the object acquisition section 250, the visual field acquisition section 260, the environment acquisition section 270, the defining section 280, and the control section 290 may be provided distributed across the plural ECUs 20.

Although the information notification system 10 of each of the exemplary embodiments described above is applied to guide the gaze for a driver of the vehicle 12, there is no limitation thereto, and the information notification system 10 may be applied to guide the gaze for an occupant other than the driver.

Note that various processors other than CPUs may be employed to execute the various processing that are read and executed by the CPU 20A reading and executing software (programs) in the above exemplary embodiments. Such processors include programmable logic devices (PLD) that allow circuit configuration to be modified post-manufacture, such as a field-programmable gate arrays (FPGA), and dedicated electric circuits, these being processors including a circuit configuration custom-designed to execute specific processing, such as an application specific integrated circuit (ASIC). Each of the above processing may be executed by any one of these various types of processors, or may be executed by a combination of two or more of the same type or different type of processor (such as plural FPGAs, or a combination of a CPU and an FPGA). The hardware structure of these various types of processors is more specifically an electric circuit combining circuit elements such as semiconductor elements.

Moreover, in the exemplary embodiments described above a mode was described in which each of the programs was pre-stored (installed) on a computer readable non-transitory storage medium. For example, the processing program 100 in the integrating ECU 21 was pre-stored in the ROM 20B of the integrating ECU 21, and the control program 150 in the light ECU 22 was pre-stored in the ROM 20B of the light ECU 22. However, there is no limitation thereto, and each of the programs may be provided in a format stored on a non-transitory storage medium such as a compact disc read only memory (CD-ROM), digital versatile disc read only memory (DVD-ROM), universal serial bus (USB) memory, or the like. These programs may also be provided in a format downloadable from an external device over a network.

The flows of processing described for the exemplary embodiments are merely examples thereof, and redundant steps may be omitted, new steps may be added, and the processing sequence may be swapped around within a range not departing from the spirit of the present disclosure.

What is claimed is:

1. A light emission control device comprising:
a memory; and
a processor coupled to the memory, wherein the processor is configured to:
acquire information related to a target object in surroundings of a vehicle; and
perform control so as to interlock light emission of a plurality of light emitting units provided inside the vehicle in a case in which the target object is present;
wherein the processor is further configured to:
acquire environment information for at least one of inside or outside the vehicle;
control light emission of the light emitting units based on the environment information;
control light emission of the light emitting units based on at least one of a contrast or a brightness inside the vehicle as the environment information; and
control light emission of the light emitting units such that a path along which to propagate light emission of the light emitting units is corrected based on the at least one of the contrast or the brightness.

2. The light emission control device of claim 1, wherein the processor is configured to perform control so as to move light emission of the plurality of light emitting units consecutively between the light emitting units.

3. The light emission control device of claim 1, wherein the processor is configured to:
further acquire a position of the target object with respect to an occupant of the vehicle; and
perform control so as to move light emission of the light emitting units consecutively either from the position of the target object or toward the position of the target object as viewed by the occupant.

4. The light emission control device of claim 1, wherein:
the processor is configured to further acquire information related to a central visual field of an occupant of the vehicle; and
at least one of a start end or a finish end of consecutively moving light emission of the light emitting units is contained in a range of the central visual field.

5. The light emission control device of claim 4, wherein the processor is configured to define the path for light emission from the plurality of light emitting units such that at least one of the start end or the finish end is contained in the range of the central visual field.

6. The light emission control device of claim 4, wherein the processor is configured to change a mode of light emission of the light emitting units based on a relationship of the start end and the finish end to the range of the central visual field.

7. A light emitting device comprising:
the light emission control device of claim 1; and
a plurality of the light emitting units.

8. The light emitting device of claim 7, wherein:
the light emitting device further comprises a display section for displaying an image toward an occupant of the vehicle, another memory, and another processor coupled to the other memory; and
the other processor is configured to:
control the image on the display section, and
by cooperating with the processor, to display the image so as to supplement the path along which to propagate emission light of the light emitting units.

9. A vehicle comprising:
a sensing section for sensing the target object; and
the light emitting device of claim 7.

10. A light emission control method executed by a processor, the light emission control method comprising:
acquiring information related to a target object in surroundings of a vehicle;
performing control so as to interlock light emission of a plurality of light emitting units provided inside the vehicle in a case in which the target object is present;
acquiring environment information for at least one of inside or outside the vehicle;
controlling light emission of the light emitting units based on the environment information;
controlling light emission of the light emitting units based on at least one of a contrast or a brightness inside the vehicle as the environment information; and
controlling light emission of the light emitting units such that a path along which to propagate light emission of the light emitting units is corrected based on the at least one of the contrast or the brightness.

11. A non-transitory storage medium storing a program executable by a processor to perform light emission control processing, the light emission control processing comprising:
acquiring information related to a target object in surrounding of a vehicle;
performing control so as to interlock light emission of the plurality of light emitting units provided inside the vehicle in s case in which the target object is present;
acquiring environment information for at least one of inside or outside the vehicle;
controlling light emission of the light emitting units based on the environment information;
controlling light emission of the light emitting units based on at least one of a contrast or a brightness inside the vehicle as the environment information; and
controlling light emission of the light emitting units such that a path along which to propagate light emission of the light emitting units is corrected based on the at least one of the contrast or the brightness.

* * * * *